(12) United States Patent
Samejima et al.

(10) Patent No.: US 7,263,819 B2
(45) Date of Patent: Sep. 4, 2007

(54) LAWN MOWER

(75) Inventors: Kazuo Samejima, Kaizuka (JP); Yoshikazu Togoshi, Osaka (JP); Masato Asahara, Sakai (JP); Hiroshi Shimada, Nara-ken (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/936,471

(22) Filed: Sep. 8, 2004

(65) Prior Publication Data

US 2005/0217231 A1    Oct. 6, 2005

(30) Foreign Application Priority Data

Mar. 30, 2004    (JP)    ............................. 2004-100505

(51) Int. Cl.
*A01D 43/06* (2006.01)
(52) U.S. Cl. ............................. 56/202; 56/16.6; 56/203
(58) Field of Classification Search .................. 56/194, 56/199, 202, 5, 16.6, 203
See application file for complete search history.

(56) References Cited

U.S. PATENT DOCUMENTS

| | | | |
|---|---|---|---|
| 4,173,111 A | * | 11/1979 | Peterson ...................... 56/202 |
| 4,532,755 A | * | 8/1985 | Schemelin et al. .......... 56/16.6 |
| 4,637,202 A | * | 1/1987 | Lamusga ..................... 56/16.6 |
| 4,723,398 A | | 2/1988 | Flenniken et al. |
| 4,738,088 A | * | 4/1988 | Klever et al. ................. 56/202 |
| 4,903,469 A | * | 2/1990 | Murakawa et al. ........... 56/202 |
| 4,969,320 A | * | 11/1990 | Langford ..................... 56/16.6 |
| 6,226,970 B1 | | 5/2001 | Busboom et al. |

* cited by examiner

*Primary Examiner*—Thomas B. Will
*Assistant Examiner*—Alicia Torres
(74) *Attorney, Agent, or Firm*—The Webb Law Firm

(57) ABSTRACT

A grass collecting apparatus includes a grass collecting container support; at least one grass collecting container mounted on the container support and having an upper end opening edge for receiving mowed grass or the like through a conduit, a guide hood for covering the grass collecting container from the above, a support portion for supporting the guide hood while allowing its displacement from a closed position to an opened position; a fixed sealing plate provided to the grass collecting container support in the vicinity of the support portion; and a movable sealing plate provided to the guide hood in the vicinity of the support portion. The movable sealing plate is disposed in opposition to the fixed sealing plate, and a free end of the movable sealing plate displaceable in association with opening/closing displacement of the guide hood approaches the fixed sealing plate at least when the guide hood is at the closed position or the opened position.

15 Claims, 12 Drawing Sheets

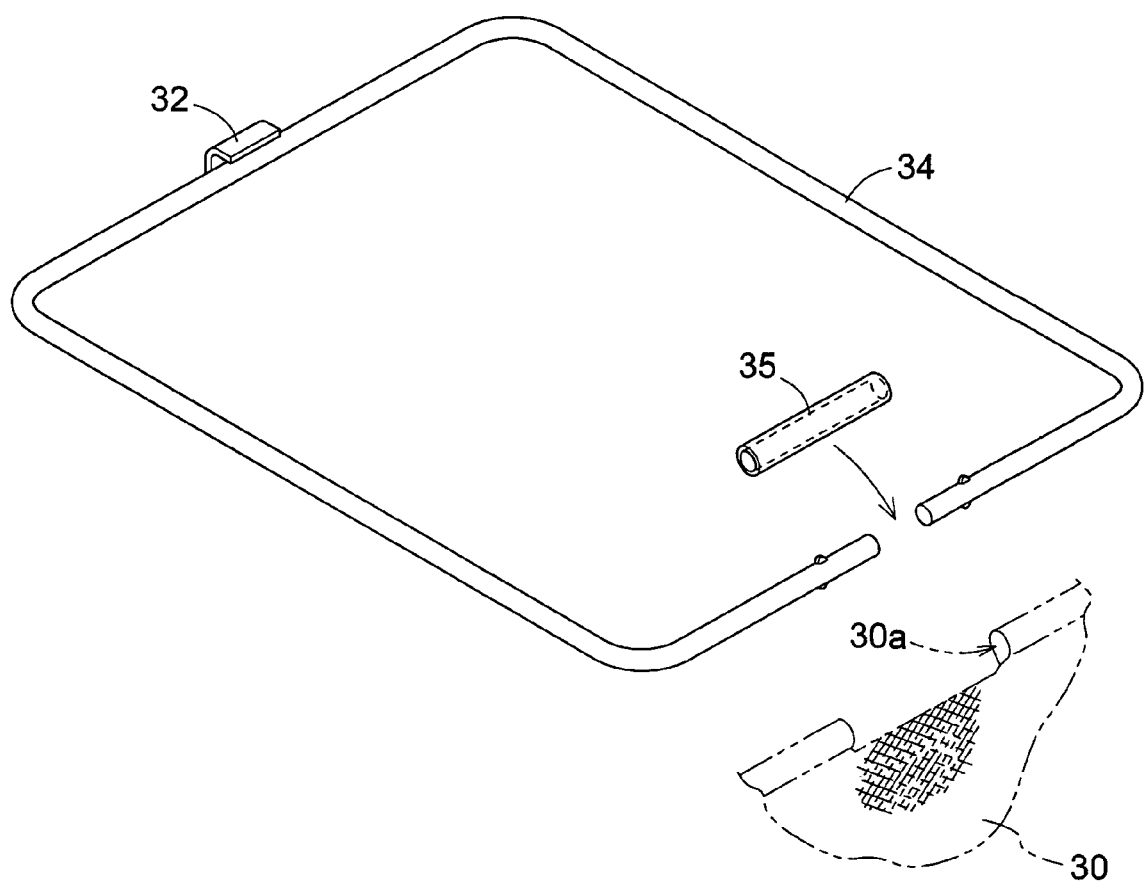

LAWN MOWER

BACKGROUND OF THE INVENTION

1. Field of the Invention

This invention relates to a lawn mower with a grass collecting apparatus connected to a rear portion of a traveling vehicle body of the lawnmower, which travels with a mower unit being mounted thereto.

2. Description of the Related Art

A grass collecting apparatus of the above type is known from U.S. Pat. No. 4,723,398 or U.S. Pat. No. 6,226,970, in either of which an upper opening edge of a bag-like grass collecting container having an upper opening is attached and supported to a grass collecting container support disposed erect from the vehicle body and a guide hood covering this grass collecting container from the above is connected to a mowed grass discharge conduit extending from a mower implement.

In the case of the grass collecting apparatus with the above-described construction, the grass collecting container is detached by pivotally opening the guide hood upward, during which, however, there is formed a gap between the container support and the guide hood in the vicinity of a pivot shaft provided for the pivotal operation. Then, some of the mowed grass adhered to the cover adjacent the pivot shaft can inadvertently fall through the gap to be dropped on the vehicle body and remain accumulated thereon.

Especially, in the case of a conventional construction having a pair of grass collecting containers mounted on the right and left above an engine section mounted on a rear portion of the traveling vehicle body, there is high likelihood of such accidentally fallen mowed grass being adhered and accumulated in a large amount on an engine hood of the engine section or on an area around it. Then, when an engine hood needs to be opened for a maintenance operation of the engine section, it becomes necessary to remove such accumulated object (grass) very carefully in order to prevent it from entering the engine room.

SUMMARY OF THE INVENTION

In view of the above, a primary object of the present invention is to provide a grass collecting apparatus capable of preventing accidental drop of mowed grass or the like through a gap between the glass collecting container support and the guide hood, not only when the guide hood is kept closed during a grass collecting operation, but also when the guide hood is opened.

For accomplishing the above-noted object, a grass collecting apparatus according to the present invention, comprises: a grass collecting container support; at least one grass collecting container mounted on the container support and having an upper end opening edge for receiving mowed grass or the like through a conduit; a guide hood for covering the grass collecting container from the above; a support portion for supporting the guide hood while allowing its displacement from a closed position to an opened position; a fixed sealing plate provided to the grass collecting container support in the vicinity of the support portion; and a movable sealing plate provided to the guide hood in the vicinity of the support portion; wherein the movable sealing plate is disposed in opposition to the fixed sealing plate, and a free end of the movable sealing plate displaceable in association with opening/closing displacement of the guide hood approaches the fixed sealing plate at least when the guide hood is at the closed position or the opened position.

With the above-described construction, during a grass collecting operation when the guide hood is kept closed and also under a condition when the guide hood is opened, the free end of the movable sealing plate approaches the fixed sealing plate, thereby to close any gap formed between the grass collecting container support and the guide hood, thus preventing accidental drop of mowed grass or the like through such gap. Incidentally, a conventional standard solution for closing such gap is using an elastic sealing member made of rubber or the like. However, after being used for an extended period of time, such elastic sealing member tends to harden or embrittle, thus being easily broken (chipped) or damaged. Further, such elastic member can be easily damaged through strong frictional contact by hard grass or the like. Hence, such member will need to be replaced in a relatively short period of time. On the other hand, according to one preferred embodiment of the present invention, the fixed sealing plate and the movable sealing plate comprise metal plates. With this, replacement thereof becomes unneeded substantially, thus providing an advantage in maintenance.

In order to allow the fixed sealing plate to fully exhibit its original sealing function as well as its further function of preventing inadvertent displacement of the grass collecting container, preferably, the grass collecting container includes, at the upper opening edge thereof, a hook-like retaining member projecting therefrom, the retaining member being retained to the grass collecting container support in the vicinity of the support portion for preventing detachment of the grass collecting container from the grass collecting container support; and the fixed sealing plate defines an opening which allows a leading end of the retaining member to be engaged therein.

According to another preferred embodiment of the present invention, the grass collecting container support supports a first grass collecting container and a second grass collecting container, the first and second grass collecting container being disposed on the right and left sides relative to an engine section of the lawn mower which unit is mounted adjacent the grass collecting container support. With this construction, it is possible to prevent accidental falling of mowed grass or the like through the gap formed between the grass collecting container support and the guide hood, and subsequent adhesion and accumulation of a large amount of the mowed grass or the like on the engine section. Therefore, it becomes unnecessary to carefully remove adhered accumulated mowed grass or the like before effecting maintenance of the engine section by opening the engine hood.

Further and other features and advantages of the present invention will become apparent upon reading the following detailed description of the preferred embodiments thereof with reference to the accompanying drawings.

BRIEF DESCRIPTION OF THE DRAWINGS

FIG. 9 is a perspective view showing a metal core for retaining shape of an upper opening edge of the grass collecting apparatus.

DESCRIPTION OF THE PREFERRED EMBODIMENTS

Figure 1:
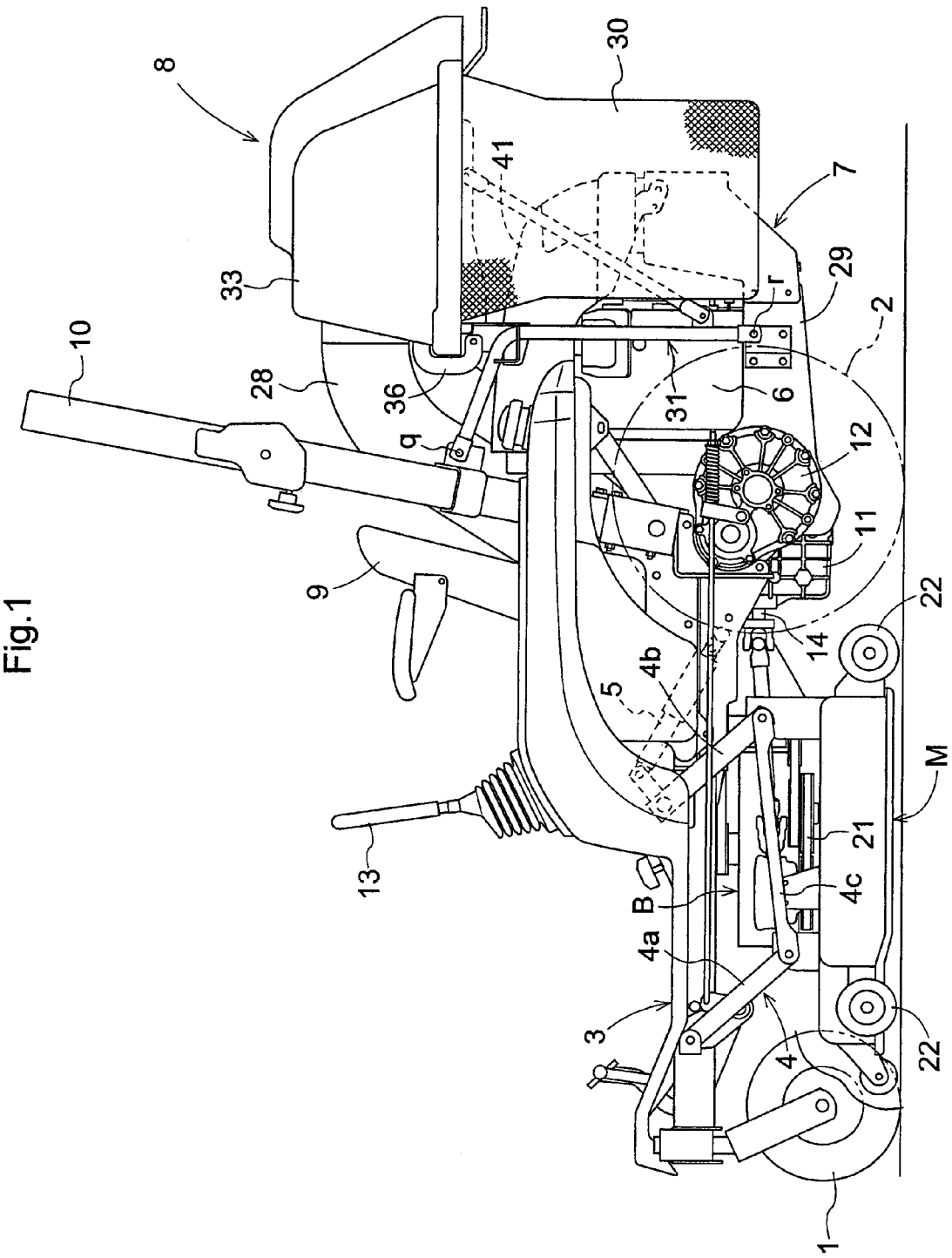
FIG. 1 is an overall side view of a lawn mower.
Figure 2:
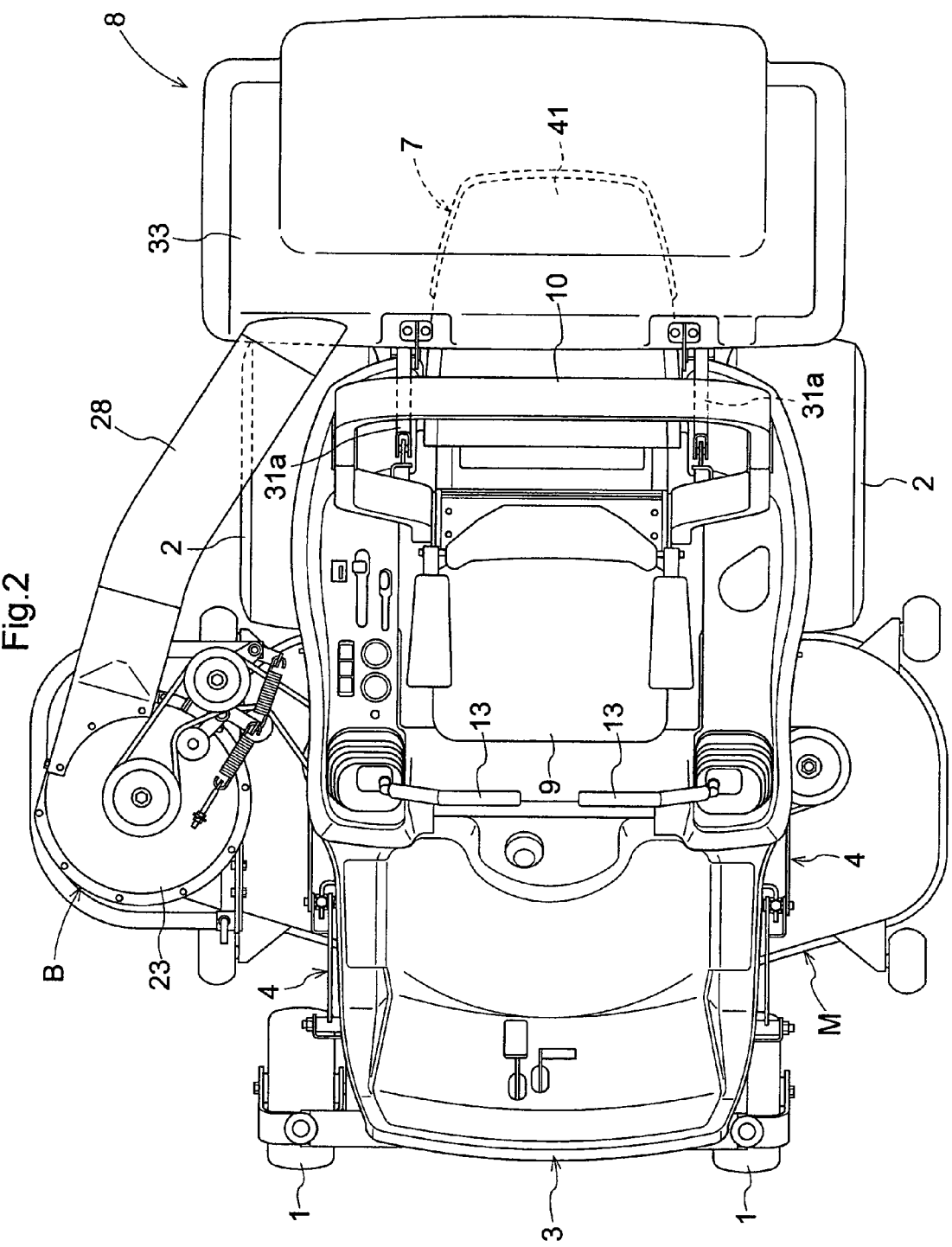
FIG. 2 is an overall plan view of the lawn mower.

FIG. 1 shows an overall side view of a lawn mower relating to the present invention. FIG. 2 is a plan view of the same. In this lawn mower, a traveling vehicle body 3 mounts a pair of right and left front wheels 1 configured as caster wheels and a pair of right and left driving rear wheels 2. To the bottom of this traveling vehicle body 3, there is suspended a mower unit M to be liftable up/down via a pair of right and left quadruple link mechanisms 4 each consisting of a front link 4a, a rear link 4b and lower connecting links 4c. By lifting up/down the link mechanisms 4 by a hydraulic cylinder 5, the mower unit M can be lifted up/down substantially in parallel. On the rear side of the traveling vehicle body 3, there is mounted an engine section 7 housing an engine 6, the section 7 projecting rearward from the rear wheels 2 and also a grass collecting apparatus 8 for collecting mowed grass, lawn or the like is mounted across and over the engine section 7. A driver's seat 9 is disposed forwardly of the engine section 7 and a portal-shaped, roll-over protection frame (POPS) 10 is mounted erect between the driver's seat 9 and the engine section 7.

FIGS. 10A, 10B, 11 and 12 show a support construction for the driver's seat 9. To a support metal member 70 provided at a rear upper portion of the traveling vehicle body 3, a seat support frame 71 is pivotally connected to be pivotable about a pivot point (x). And, to this seat support frame 71, the driver's seat 9 is attached through right and left slide adjusting mechanisms 72 to be adjustable in position in the fore and aft direction. On the other hand, on the top of a vehicle frame 73, there are mounted a pair of right and left cushion springs 74 for receiving the seat support frame 71 which has been pivoted to a seated posture, a push-up spring 75 providing an urging force strong enough to pivotally push up the evacuated (un-seated) driver's seat 9 together with the seat support frame 71, and a seating detection switch 76 disposed in opposition to the seat support frame 71 from its under side. The seating detection switch 76 is operably connected to an engine controlling circuit so that under the seated condition, the engine is allowed to be started whereas the engine is stopped upon detection of absence of any seated driver during vehicle operation.

Figure 11:
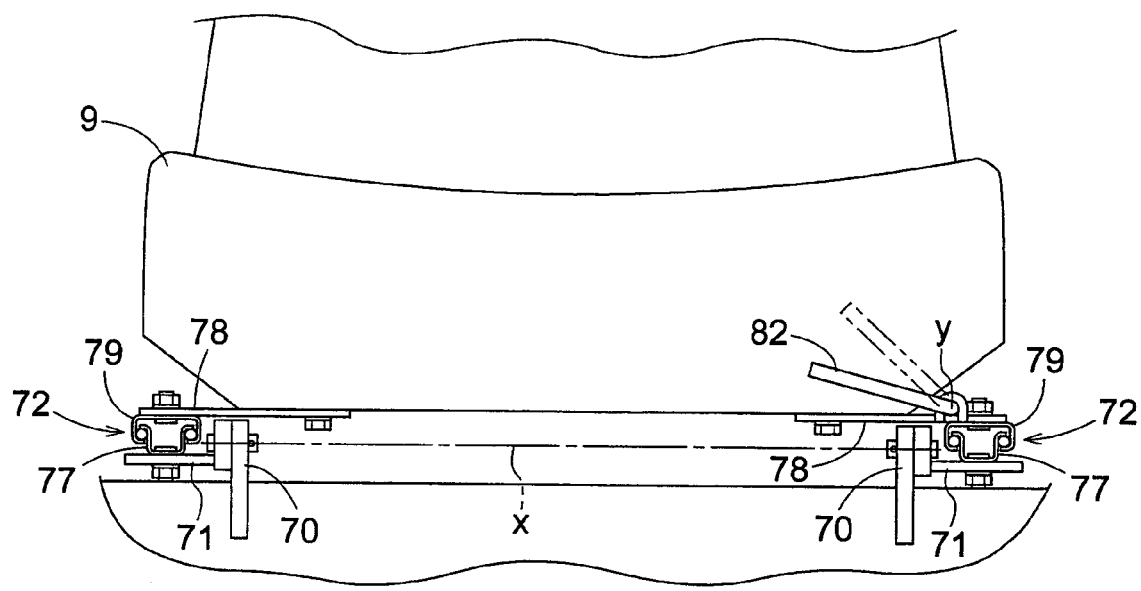
FIG. 11 is a front view of the driver's seat support construction.
Figure 12:
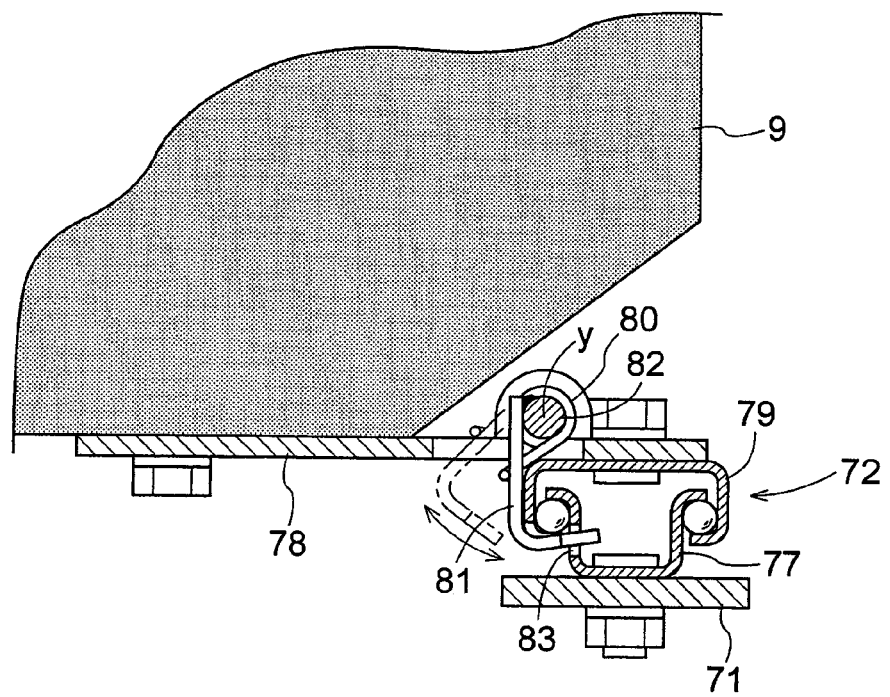
FIG. 12 is a front view in vertical section showing a portion of the driver's seat support construction in an enlarged scale.

As shown in FIGS. 11 and 12, the slide adjusting mechanisms 72 are disposed within spaces formed by obliquely cutting away lower corners of right and left sides of the driver's seat 9. Each mechanism 72 includes a guide rail 77 elongate in the fore and aft direction and secured to the seat support frame 71, a slider 79 secured to the bottom face of the driver's seat 9 via a bracket 78, a lock metal member 81 and a lock lever 82 which are attached to the bracket 78 to pivotable about a fore-and-aft pivot point (y) and pivotally urged by a spring 80, and so on. When the lock metal member 81 is urgedly engaged with a plurality of notches 83 formed along the guide rail 77, fore-and-aft displacement of the driver's seat 9 is prevented. Whereas, when the lock lever 82 is pivoted up against the urging force of the spring 80, the lock metal member 81 is released from the notches 83, thus allowing the fore-and-aft displacement of the driver's seat 9.

Though not described in details, the power of the engine 5 is inputted to a counter case 11 to be divided into power for driving traveling system and power for driving implement (mower) system. The traveling driving power is inputted to a pair of right and left unillustrated hydraulic stepless change speed units (HST) mounted on the right and left sides of the counter case 11, so that speed-changed power from each change speed unit (HST) is transmitted via a reduction case 12 to either the right or left rear wheel 2 corresponding thereto. By operating respectively right and left traveling levers 13 provided on the right and left sides of the driver's seat 9 to be pivotable in the fore and aft direction, the HST units can change speeds of the right and left rear wheels 2 independently of each other in stepless manner and between the forward and reverse directions also. More particularly, by operating these right and left traveling levers 13 in various manners, the operator can effect a straight forward or reverse traveling, a gentle turn by driving the right and left rear wheels 2 in a same direction with a speed difference therebetween, a pivot turn by stopping one rear wheel 2, a spin turn by driving the right and left rear wheels 2 in opposite directions from each other, etc. On the other hand, the implement driving power is outputted from a PTO shaft 14 projecting from the front lower side of the counter case 11 to be transmitted eventually to the mower unit M.

Figure 3:
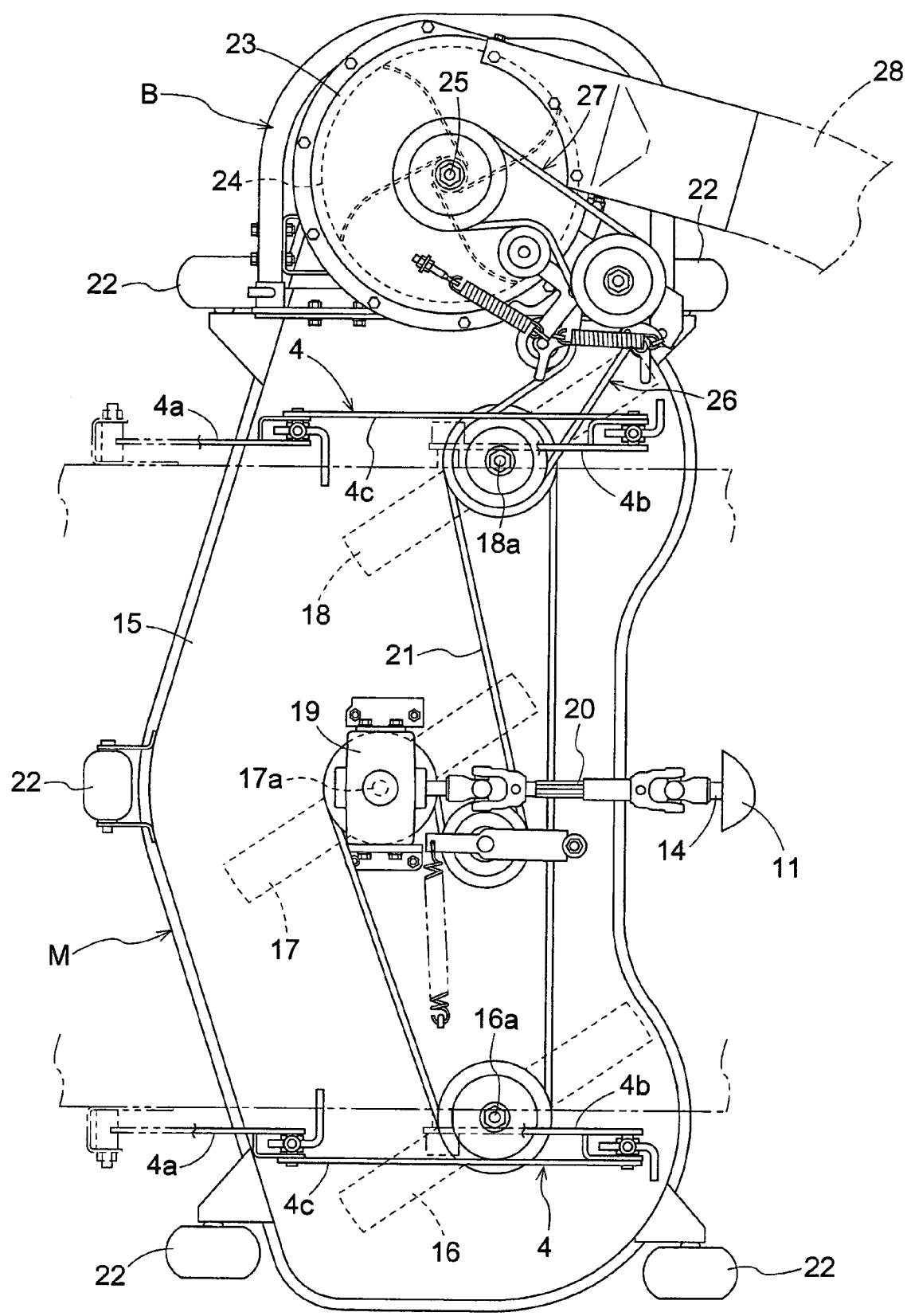
FIG. 3 is a plan view of a mower unit.

Referring now to the mower unit M, as shown in FIG. 3, a mower deck 15 having an open bottom houses therein three bar-like blades 16, 17, 18 which are juxtaposed and rotatably driven about respective vertical axes in a same direction. The deck 16 is configured as a flat deck having a substantially level top plate height and forming an unillustrated mowed grass discharge opening on its right end.

The implement driving power taken from the PTO shaft 14 is transmitted to a bevel gear case 19 mounted on a central upper face of the deck 15 via a flexible, expandable/retractable shaft transmission mechanism 20. The bevel gear case 19 converts the inputted power into a rotational power about a vertical axis and this power is transmitted to a rotary shaft 17a of the center bar blade 17. Further, the rotary shaft 17a is operably coupled to rotary shafts 16a, 18a of the right and left bar blades 16, 18 via a belt 21 entrained about these shafts. Hence, all of the blades 16, 17, 18 are driven in a same direction (the clockwise direction in the figure) so that front half portions of the rotational paths of the respective blades 16, 17, 18 may be directed toward the grass discharge opening (d). Along the periphery of the deck 15, there are provided free wheels (anti-scalp rollers) 22 for riding over obstacles which may be present on the ground surface.

To the right end of the deck 15 of the mower M, there is detachably attached a blower B for forcibly air-conveying the mowed grass discharged from the mowed grass discharge opening toward the grass collecting apparatus 8 mounted on the rear portion of the vehicle body. This blower 23 includes a casing 23 in which a rotary blade 24 is mounted to be rotatable about a vertical axis. And, a rotary shaft 25 of this rotary blade 24 is operably connected to the rotary shaft 18a of the right rotary bar blade 18 via a first belt transmission mechanism 26 having a tension clutch and a second belt transmission mechanism 27 having an automatic tension function. Further, a front end of a mowed grass discharge conduit 28 is connected to the casing 23 by insertion.

The grass collecting apparatus 8 is constructed such that the mowed grass, lawn or the like conveyed and guided through the conduit 28 is collected into two grass collecting containers 30 mounted on the right and left sides of the engine section 7. The construction of this apparatus 8 will be detailed next.

To the rear side of the traveling vehicle body 3, there is attached a grass collecting container support 31 for supporting the grass collecting apparatus 8. This grass collecting container support 31 includes a pair of right and left vertical frames 71a pin-connected between and across the right and left supporting portions of the roll-over protection frame 10 and an engine mounting frame 29 disposed downwardly of the engine section 7, a transverse frame 31b extending between and across the top portions of the right and left frames 31a, and four support arms 31c extending rearward from the transverse frame 31b. Each right or left pair of support arms 31c and the transverse frame 31b together support an upper end opening edge of each grass collecting container 30. Further, to the upper front portion of the grass collecting container support 31, there is attached a guide hood 33 formed of resin maternal and adapted for covering the right and left grass collecting containers 30 from the above.

Each grass collecting container 30 is formed of cloth having high air permeability and sewn into a rectangular column like bag. The container 30 has an insertion hole 30a formed along the upper end opening edge; and a core frame 34 formed of a metal bar is inserted into the hole 30a for retaining a rectangular shape of the opening edge of the container. Incidentally, a rear center portion of the core frame 34 is cut open for allowing insertion into the insertion hole 30a. After its insertion, opposed separated ends of the core frame 34 are connected together by a connecting pipe 35 for preventing expanding deformation of the core frame 34.

Figure 4:
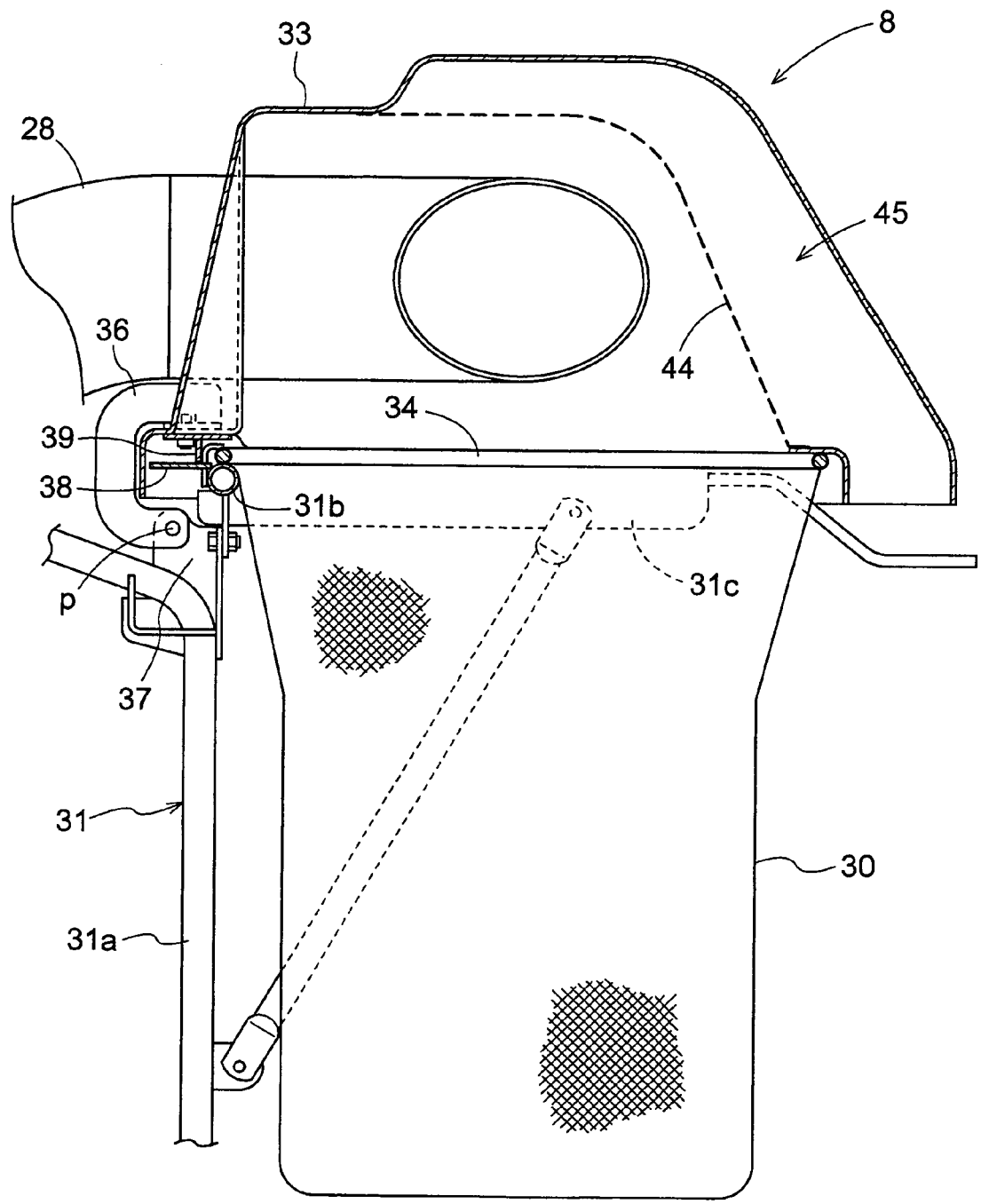
FIG. 4 is a side view of a grass collecting apparatus.
Figure 5:
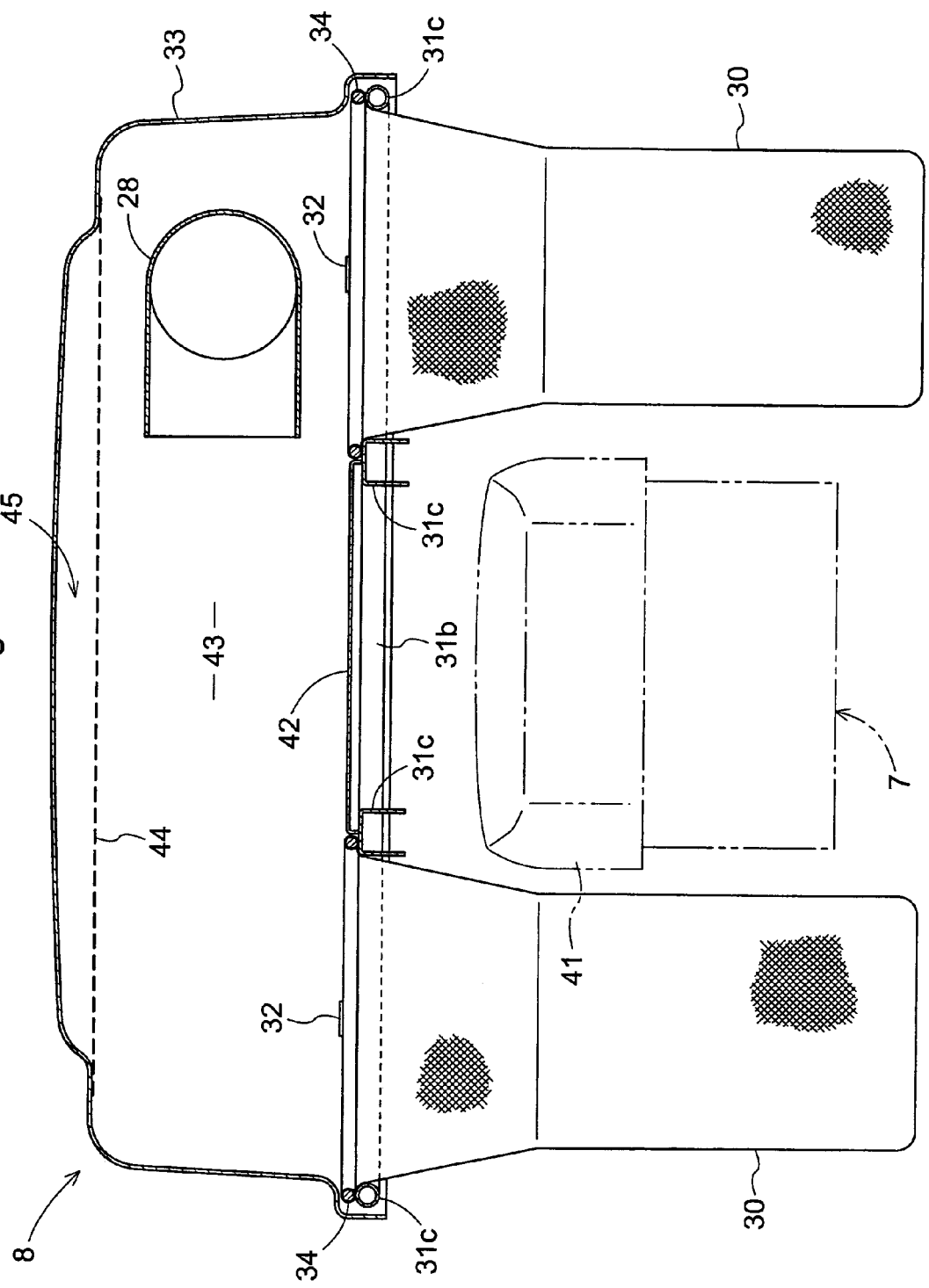
FIG. 5 is a rear view of the glass collecting apparatus.
Figure 6:
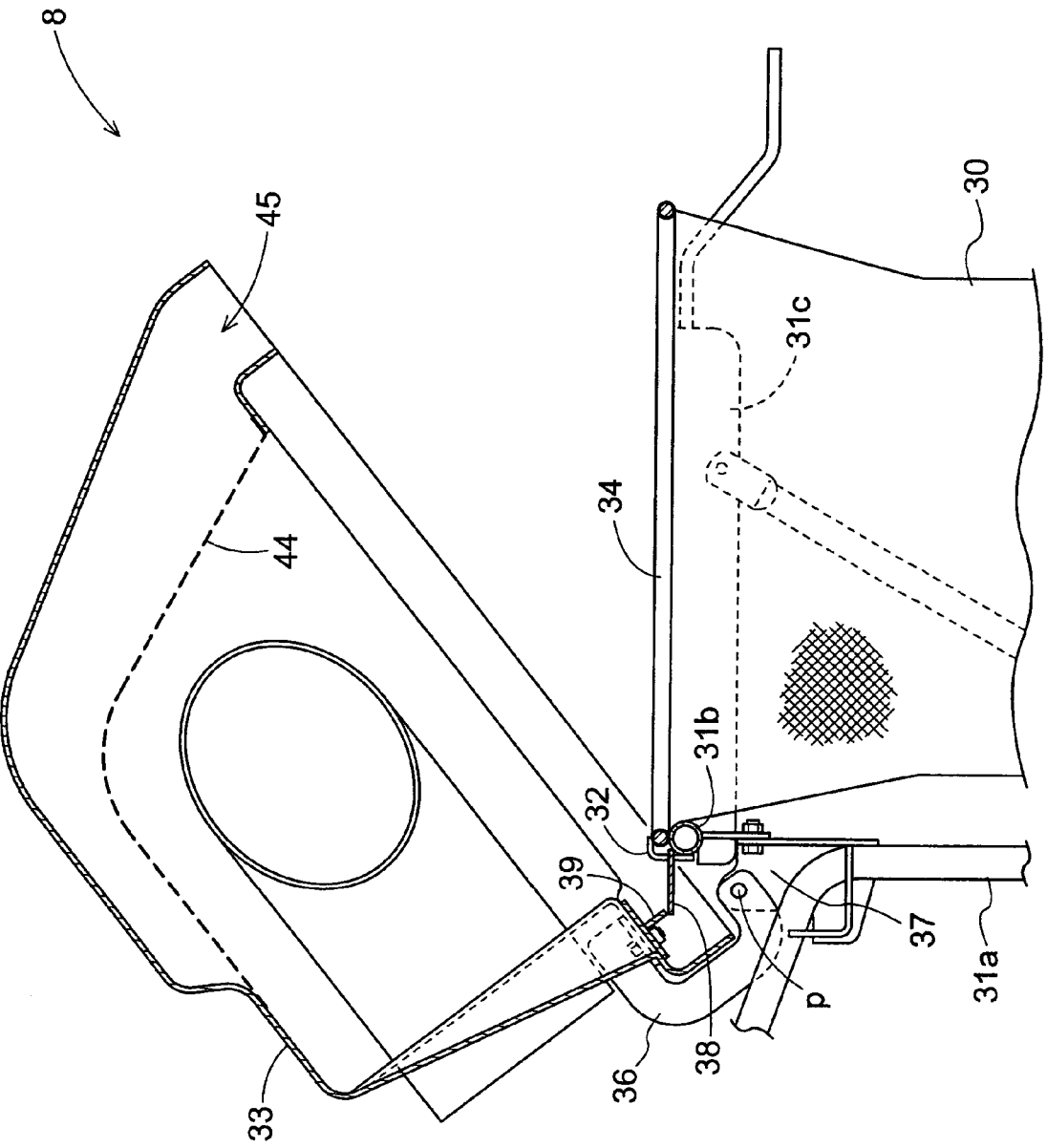
FIG. 6 is a side view showing the grass collecting apparatus with a guide hood being opened.
Figure 7:
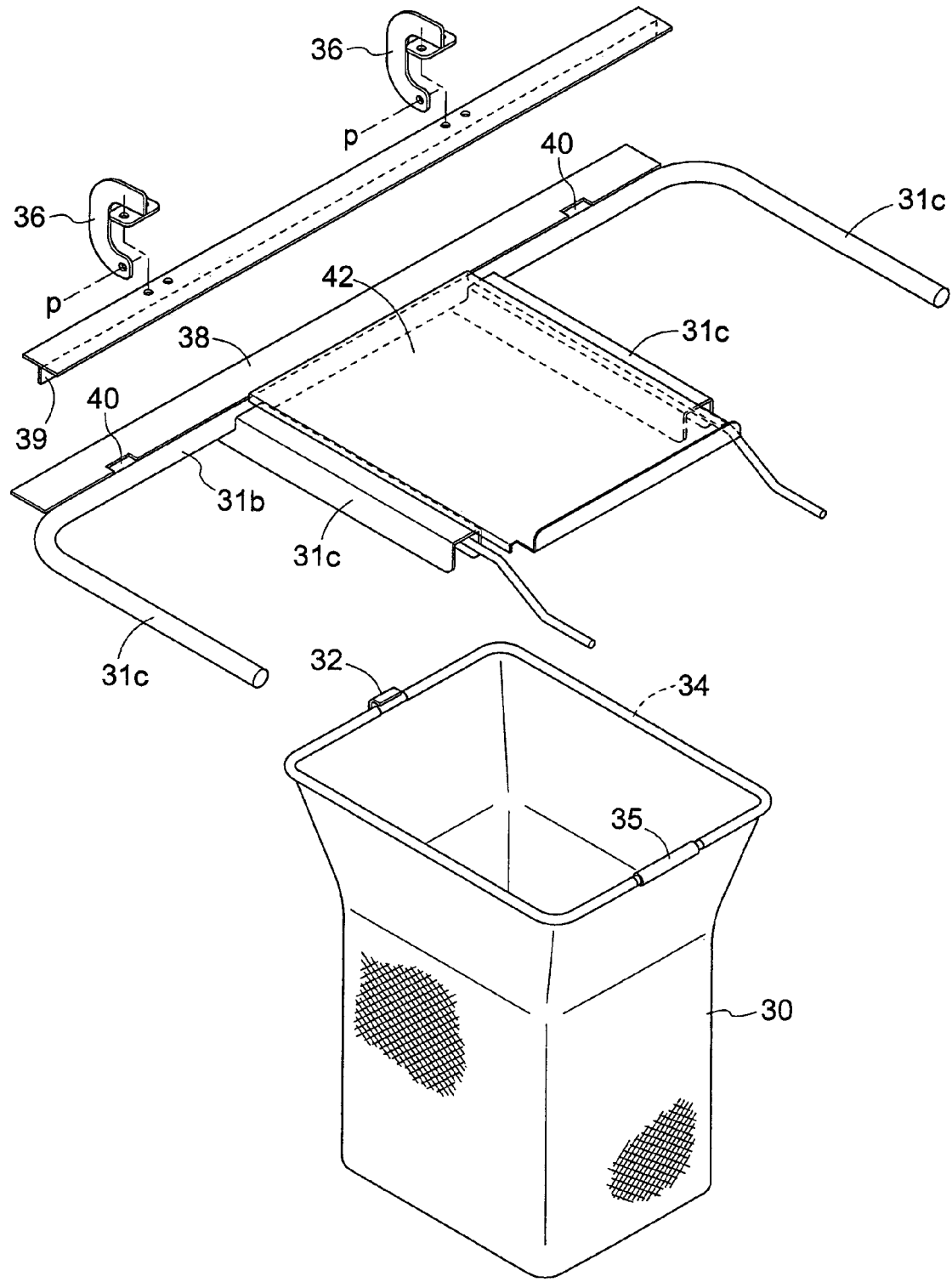
FIG. 7 is an exploded perspective view showing a portion of the grass collecting apparatus.
Figure 8A:
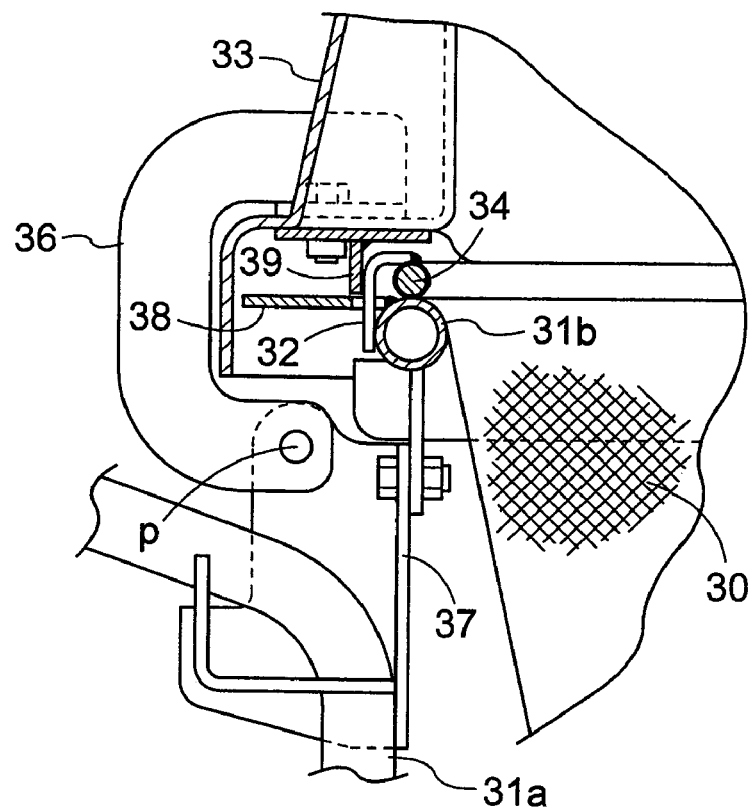
FIG. 8A is a side view in vertical section showing a front end sealing portion of the grass collecting apparatus under a closed condition.

As shown in FIGS. 4 and 5, the guide hood 33 has a lateral width and a longitudinal width sufficient for continuously covering the upper end openings of the right and left grass collecting containers 30. And, this guide hood 33 as a whole has a downwardly open configuration. The guide hood 33 has, at its front end, metal hinge members 36 each having a C-shape in its side view. So that, via these hinge members 36, the guide hood 33 is pivotally connected to brackets 37 provided at upper end front portions of the grass collecting container support 31, so that the guide hood 33 can be pivotally opened/closed about a pivot axis (p) extending transversely. Further, as shown in FIG. 8A, to the transverse frame 31b of the grass collecting container support 31, there is fixed a fixed sealing plate 38 in a forwardly extending, cantilever manner. Further, to the vicinity of the front end of the guide hood 33, there is fixed a movable sealing plate 39 extending downward therefrom, with a lower end of this movable sealing plate 39 being in substantially perpendicular opposition to the upper face of the fixed sealing plate 38. With this, the gap between the front end of the guide hood 33 and the transverse frame 31b is closed or sealed by these two sealing plates 38, 39.

Then, the opening edges of the grass collecting containers 30 whose shapes are retained by the respective core members 34 in the manner described above are placed and supported on the top faces of the two support arms 31c and the transverse frame 31b. A retaining member 32 projecting from a front central portion of each core member 34 is inserted into an opening formed as a cutout in the fixed sealing plate 38 and then engaged with the transverse frame 31b from the front side thereof. Further, the opening edges of the containers are supported by the lower edges of the guide hood 33 which is lowered. These arrangements prevent displacement of each grass collecting container 30 on the grass collecting container support 31 in the fore and aft direction and in the right and left direction and prevent also inadvertent "floating" (upward) displacement of the container 30 off the support 31.

The support arms 31c two of which mount ether the right or left grass collecting container 30 corresponding thereto are disposed at a position slightly higher than an engine hood 41 provided for the engine section 7. And, across and between the inner side two support arms 31c, there is attached a bottom plate 42 configured to cover the engine hood 41 from the above. When the guide hood 33 is lowered, this bottom plate 42 forms, inside the guide hood 33, a tunnel passage 43 communicating the upper spaces of the right and left container mounted positions. So that, the mowed grass introduced to the right side of the guide hood 33 through the conduit 28 may be guided through the guide hood 33 into the right and left grass collecting containers 30, respectively. Incidentally, grass-conveying air current introduced to the inside of the guide hood 33 is discharged through a mesh-like, air discharge opening 44 formed in an inner face of a rear half portion of the guide hood 33 into an air discharge passage 45, from which the air is discharged eventually to the rear lower side of the vehicle body.

Figure 8B:
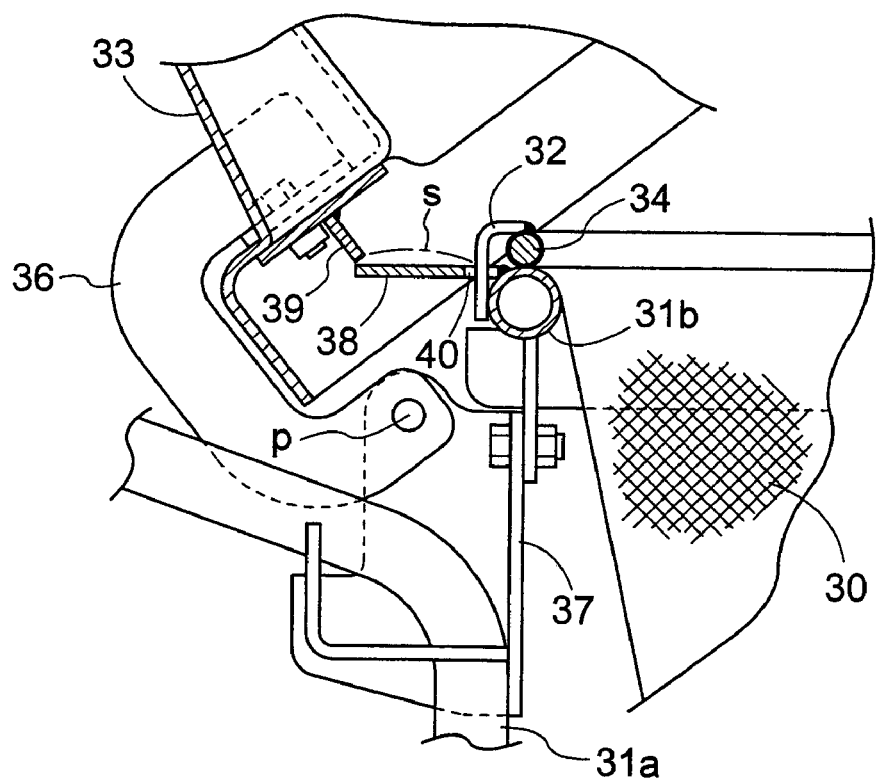
FIG. 8B is a side view in vertical section showing the front end sealing portion of the grass collecting apparatus under an opened condition.
Figure 10A:
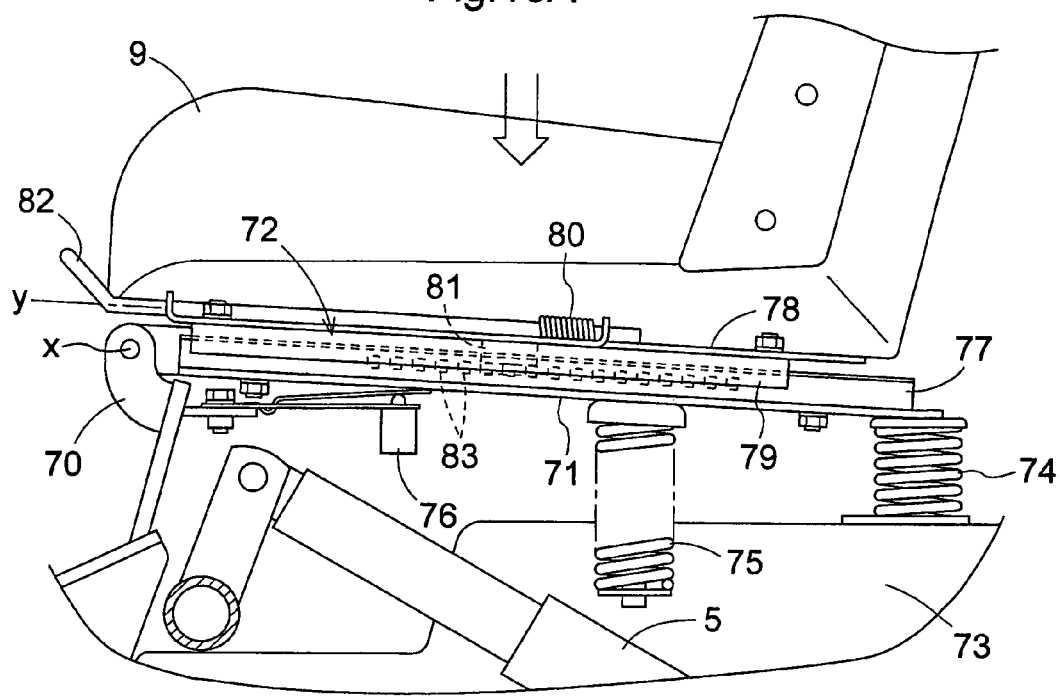
FIG. 10A is a side view showing s support construction for a driver's seat when a driver is seated thereon.
Figure 10B:
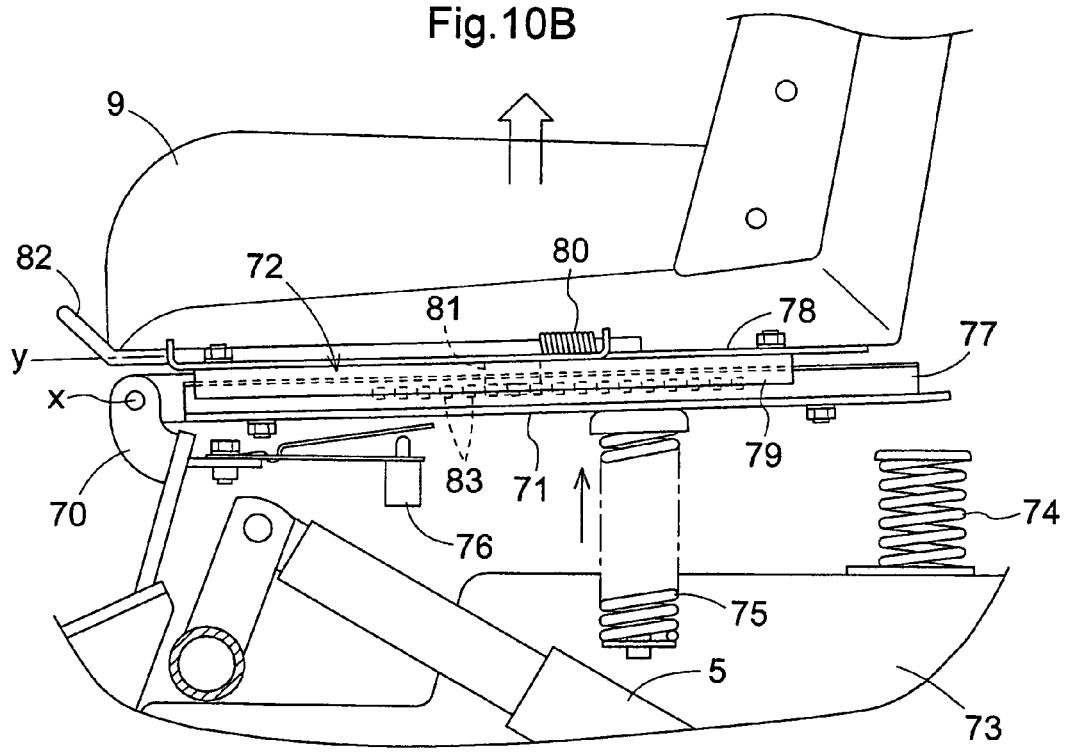
FIG. 10B is a side view showing s support construction for the driver's seat when a driver is not seated thereon.

In the above, as shown in FIG. 8A and FIG. 8B, when the guide hood 33 is pivotally opened/closed, the lower end of the movable sealing plate 39 provided at the front end of the guide hood 33 moves along an arcuate path (s) about a pivot axis (p). In this connection, the attaching position of the movable sealing plate 39 relative to the pivot axis (p) is set such that under the closed condition of the guide hood 33, this lower end of the movable sealing plate 39 is located adjacent the top face of the fixed sealing plate 38 on the rear side of the pivot axis (p), whereas, under the forwardly and upwardly opened condition of the guide hood 33, the lower end of the movable sealing plate 39 is located adjacent the top face of the fixed sealing plate 38 on the forward side of the pivot axis (p). With this arrangement, regardless of opening/closing of the guide hood 33, the gap between the front end of the guide hood 33 and the transverse frame 31a can be closed and sealed by the fixed sealing plate 38 which is provided as a rigid member entirely in cooperation with the movable sealing plate 39 (which can be rigid entirely or be partially flexible), thus preventing leak or fall of the mowed grass through the gap. As a result, accidental fall and subsequent accumulation of leaked mowed grass on the engine section 7 is avoided.

For effecting a maintenance of the engine section 7, the pin connection (q) between the grass collecting container support 31 and the ROPS frame 10 will be released and then the entire grass collecting apparatus 8 will be pivoted rearward about its pin connecting point (r) relative to the engine mounting frame 29, thus exposing and allowing access to the area around the engine section 7.

Figure 13:
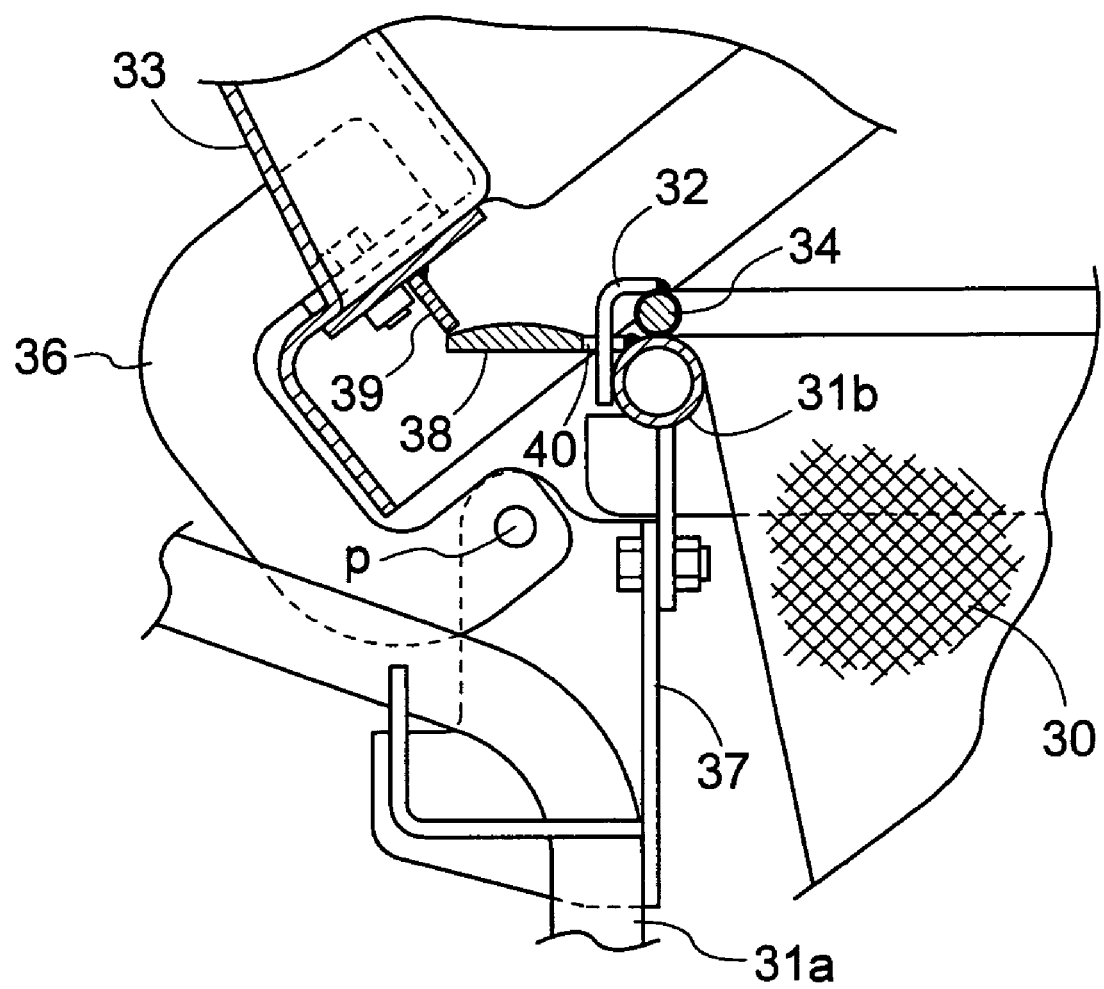
FIG. 13 is a side view in vertical section showing the front end sealing portion of the grass collecting apparatus under an open condition with an alternate embodiment of a fixed sealing plate.

Other Embodiments (1) The face of the fixed sealing plate 38 can be formed in a curved shape along the arcuate moving path of the free (lower) end of the movable sealing plate 39, as shown in FIG. 13. This can ensure even higher sealing performance over the entire opening/closing range of the guide hood 33.

(3) The movable sealing plate 39 may be formed integral with the guide hood 33.

The present invention may be embodied in any other manner than described above. Various modifications thereof will be apparent for those skilled in the art without departing from the essential concept thereof defined in the appended claims.

The invention claimed is:

1. A lawn mower having a mower unit and a grass discharge conduit extending rearwardly therefrom, the lawn mower comprising:
a grass collecting container support;
at least one grass collecting container mounted on the container support and having an upper end opening edge for receiving mowed grass through the conduit;
a guide hood for covering the grass collecting container from the above;
a support portion for supporting the guide hood while allowing its displacement from a closed position to a fully-opened position;
a fixed sealing plate provided to the grass collecting container support in the vicinity of the support portion; and
a movable sealing plate provided to the guide hood in the vicinity of the support portion;
wherein the movable sealing plate is disposed in opposition to the fixed sealing plate, and a free end of the movable sealing plate, which is displaceable in association with a displacement of the guide hood, approaches the fixed sealing plate at least as the guide hood approaches the fully-opened position, said support portion is configured as a pivot axis and a free end of said movable sealing plate is displaced along an arcuate path about said pivot axis in association with the opening/closing displacement of the guide hood and the free end of said movable sealing plate is a lower end of the movable sealing plate, and further wherein
a relative position of the movable sealing plate with respect to the pivot axis is in a manner that:
the lower end of the movable sealing plate is located adjacent a top face of the fixed sealing plate at a location rearwardly with respect to the pivot axis when the guide hood is in the closed position, and
the lower end of the movable sealing plate is located adjacent a top face of the fixed sealing plate at a location forwardly with respect to the pivot axis when the guide hood is in the opened position.

2. The lawn mower according to claim 1, wherein a face of said fixed sealing plate opposed to said movable sealing plate is curved along said arcuate path of the free end of the movable sealing plate.

3. The lawn mower according to claim 1, wherein at least a portion of said movable sealing plate is flexible and said movable sealing plate is flexed when the free end thereof comes into contact with said fixed sealing plate.

4. The lawn mower according to claim 1, wherein said fixed sealing plate is formed integral with a member constituting said grass collecting container support.

5. The lawn mower according to claim 1, wherein said movable sealing plate is formed integral with a member constituting said guide hood.

6. The lawn mower according to claim 1, wherein the grass collecting container includes, at the upper opening edge thereof, a retaining member projecting therefrom, and the fixed sealing plate defines an opening which allows a leading end of the retaining member to be engaged therein.

7. The lawn mower according to claim 1, wherein the grass collecting container support supports a first grass collecting container and a second grass collecting container, the first and second grass collecting container being disposed on the right and left sides relative to an engine section of the lawn mower which unit is mounted adjacent the grass collecting container support.

8. The lawn mower according to claim 1, wherein the pivot axis is positioned below the fixed sealing plate.

9. The lawn mower according to claim 1, wherein the movable sealing plate extends substantially vertically when the guide hood is in the closed position.

10. The lawn mower according to claim 1, wherein at least a part of the fixed sealing plate is located between the arcuate path and the pivot axis.

11. The lawn mower according to claim 1, wherein the fixed sealing plate is rigid.

12. A lawn mower having a mower unit and a grass discharge conduit extending rearwardly therefrom, the lawn mower comprising:
a grass collecting container support with a transverse frame;
at least one grass collecting container mounted on the container support and having an upper opening for receiving mowed grass through the conduit;
a hood for covering the grass collecting container from the above;
a support portion for pivotally supporting the hood between a closed position and a fully-opened position;
a fixed seal provided to a front region of the grass collecting container support, substantially an entirety of the fixed seal extending horizontally from the transverse frame; and
a movable seal provided to a lower front region of the hood, an end of the movable seal moves in an arcuate path about a pivotal axis as the hood moves from the closed position to the fully-opened position, wherein at least a part of the fixed seal is located between the arcuate path and the pivotal axis thereby the end of the movable seal approaches the fixed seal at least when the hood approaches the fully-opened position.

13. The lawn mower according to claim 12, wherein the end of the movable seal is a lower end of the movable seal and further wherein
a relative position of the movable seal with respect to the pivot axis is in a manner that:
the lower end of the movable seal is located adjacent a top face of the fixed seal at a location rearwardly with respect to the pivot axis when the guide hood is in the closed position, and
the lower end of the movable seal is located adjacent a top face of the fixed seal at a location forwardly with respect to the pivot axis when the guide hood is in the opened position.

14. The lawn mower according to claim 12, wherein the movable seal extends substantially vertically when the guide hood is in the closed position.

15. The lawn mower according to claim 12, wherein the fixed seal is plate-shaped and rigid.

* * * * *